(12) United States Patent
Merlin et al.

(10) Patent No.: US 10,834,754 B2
(45) Date of Patent: Nov. 10, 2020

(54) SYSTEMS AND METHODS FOR IMPROVED COMMUNICATION EFFICIENCY IN HIGH EFFICIENCY WIRELESS NETWORKS

(71) Applicant: QUALCOMM Incorporated, San Diego, CA (US)

(72) Inventors: Simone Merlin, Solana Beach, CA (US); Santosh Paul Abraham, San Diego, CA (US); Patrick Stupar, Nuremberg (DE); Andrea Garavaglia, Nuremberg (DE)

(73) Assignee: QUALCOMM Incorporated, San Diego, CA (US)

( * ) Notice: Subject to any disclaimer, the term of this patent is extended or adjusted under 35 U.S.C. 154(b) by 205 days.

(21) Appl. No.: 14/525,172

(22) Filed: Oct. 27, 2014

(65) Prior Publication Data
US 2015/0117365 A1  Apr. 30, 2015

Related U.S. Application Data

(60) Provisional application No. 61/897,135, filed on Oct. 29, 2013, provisional application No. 61/924,156, (Continued)

(51) Int. Cl.
*H04W 74/04* (2009.01)
*H04W 84/12* (2009.01)
(Continued)

(52) U.S. Cl.
CPC ............. *H04W 74/04* (2013.01); *H04L 5/00* (2013.01); *H04W 24/10* (2013.01);
(Continued)

(58) Field of Classification Search
None
See application file for complete search history.

(56) References Cited

U.S. PATENT DOCUMENTS

| 6,356,921 B1 | 3/2002 | Kumar et al. |
| 6,674,738 B1 | 1/2004 | Yildiz et al. |

(Continued)

FOREIGN PATENT DOCUMENTS

| CN | 101714893 A | 5/2010 |
| CN | 101841348 A | 9/2010 |

(Continued)

OTHER PUBLICATIONS

Michelle X. Gong et al ("Directional CSMA/CA Protocol with Spatial Reuse for mmWave Wireless Networks"), Globecom 2010, 2010 IEEE Global Telecommunications Conference, IEEE, Piscataway, NJ, USA, Dec. 6, 2010, pp. 1-5, XP031846733, ISBN: 978-1-4244-5636-9.*

(Continued)

*Primary Examiner* — Jeffrey M Rutkowski
*Assistant Examiner* — Mehedi S Aley
(74) *Attorney, Agent, or Firm* — Steven R. Thiel

(57) ABSTRACT

Methods and apparatus for selectively setting a network allocation vector for a subset of stations as disclosed. A method of reserving access to wireless communication medium for a plurality of wireless devices includes, transmitting a message including a first indication for a first subset of wireless devices of the plurality of wireless devices to set a network allocation vector (NAV) and further includes a second indication for a second subset of wireless devices of the plurality wireless devices to not set the NAV, so as to reserve access to the wireless medium for at least the second subset of the plurality of wireless devices.

21 Claims, 8 Drawing Sheets

900

902

TRANSMIT A MESSAGE INCLUDING A FIRST INDICATION FOR A FIRST SUBSET OF WIRELESS DEVICES OF THE PLURALITY OF WIRELESS DEVICES TO SET A NETWORK ALLOCATION VECTOR (NAV) AND FURTHER INCLUDING A SECOND INDICATION FOR A SECOND SUBSET OF WIRELESS DEVICES OF THE PLURALITY WIRELESS DEVICES TO NOT SET THE NAV, THEREBY RESERVING ACCESS TO THE WIRELESS MEDIUM FOR AT LEAST THE SECOND SUBSET OF THE PLURALITY OF WIRELESS DEVICES

Related U.S. Application Data filed on Jan. 6, 2014, provisional application No. 61/928,845, filed on Jan. 17, 2014.

(51) Int. Cl.
| | |
|---|---|
| *H04L 5/00* | (2006.01) |
| *H04W 24/10* | (2009.01) |
| *H04W 52/24* | (2009.01) |
| *H04W 72/04* | (2009.01) |
| *H04W 72/08* | (2009.01) |
| *H04L 12/911* | (2013.01) |
| *H04L 27/00* | (2006.01) |

(52) U.S. Cl.
CPC ..... *H04W 52/243* (2013.01); *H04W 72/0473* (2013.01); *H04W 72/082* (2013.01); *H04W 84/12* (2013.01); *H04L 5/0078* (2013.01); *H04L 27/0006* (2013.01); *H04L 47/826* (2013.01); *H04L 47/828* (2013.01)

(56) References Cited

U.S. PATENT DOCUMENTS

| | | |
|---|---|---|
| 6,873,627 B1 | 3/2005 | Miller et al. |
| 7,426,395 B2 | 9/2008 | Stephens |
| 7,583,649 B1 | 9/2009 | Bagchi |
| 8,099,096 B2 | 1/2012 | Prakash et al. |
| 8,351,365 B2 | 1/2013 | Seok |
| 8,848,561 B2 | 9/2014 | Siomina et al. |
| 8,861,442 B2 | 10/2014 | Zhu et al. |
| 2002/0172186 A1 | 11/2002 | Larsson |
| 2002/0181425 A1* | 12/2002 | Sherman ........... H04W 74/0808 370/338 |
| 2004/0186907 A1 | 9/2004 | Wentink |
| 2004/0228311 A1 | 11/2004 | Sugaya et al. |
| 2005/0089013 A1 | 4/2005 | Okagawa et al. |
| 2005/0243843 A1 | 11/2005 | Imamura et al. |
| 2006/0133286 A1 | 6/2006 | Elie-Dit-Cosaque et al. |
| 2006/0165114 A1 | 7/2006 | Diepstraten et al. |
| 2006/0194616 A1 | 8/2006 | Willins et al. |
| 2006/0268715 A1 | 11/2006 | Zuniga et al. |
| 2006/0268766 A1 | 11/2006 | Rangarajan et al. |
| 2007/0076752 A1* | 4/2007 | Zeira .................... H04L 1/0079 370/466 |
| 2007/0110035 A1 | 5/2007 | Bennett |
| 2007/0127428 A1 | 6/2007 | Lee et al. |
| 2007/0189168 A1 | 8/2007 | Yao |
| 2007/0248034 A1 | 10/2007 | Hsu et al. |
| 2008/0056211 A1 | 3/2008 | Kim et al. |
| 2008/0232298 A1 | 9/2008 | Kim et al. |
| 2008/0273700 A1 | 11/2008 | Wentink |
| 2008/0316997 A1 | 12/2008 | Zeng et al. |
| 2008/0317155 A1 | 12/2008 | Orfanos et al. |
| 2009/0064244 A1 | 3/2009 | Shin et al. |
| 2009/0144470 A1 | 6/2009 | Perrot et al. |
| 2009/0290524 A1 | 11/2009 | Seok |
| 2009/0307334 A1 | 12/2009 | Maltz et al. |
| 2010/0085950 A1* | 4/2010 | Sekiya .............. H04W 72/1215 370/338 |
| 2010/0142450 A1 | 6/2010 | Kangude et al. |
| 2010/0248635 A1 | 9/2010 | Zhang et al. |
| 2010/0278048 A1 | 11/2010 | Sawaguchi |
| 2011/0199953 A1 | 8/2011 | Seok |
| 2011/0280232 A1 | 11/2011 | Wu et al. |
| 2011/0292897 A1 | 12/2011 | Wu et al. |
| 2011/0317630 A1 | 12/2011 | Zhu et al. |
| 2012/0076073 A1 | 3/2012 | Merlin et al. |
| 2012/0087355 A1* | 4/2012 | Wentink ............. H04W 74/006 370/338 |
| 2012/0087358 A1 | 4/2012 | Zhu et al. |
| 2012/0099450 A1 | 4/2012 | Madan et al. |
| 2012/0250617 A1 | 10/2012 | Wentink |
| 2013/0148517 A1 | 6/2013 | Abraham et al. |
| 2013/0184030 A1 | 7/2013 | Tavildar et al. |
| 2013/0195081 A1* | 8/2013 | Merlin ................ H04W 74/002 370/336 |
| 2014/0029499 A1* | 1/2014 | Chu .................. H04W 52/0206 370/311 |
| 2014/0112266 A1* | 4/2014 | Seok .................... H04W 74/04 370/329 |
| 2014/0204872 A1* | 7/2014 | Yang ................. H04W 74/0816 370/329 |
| 2014/0307625 A1 | 10/2014 | Wentink |
| 2015/0117366 A1 | 4/2015 | Stupar et al. |
| 2015/0124687 A1 | 5/2015 | Wentink et al. |
| 2015/0131530 A1 | 5/2015 | Wentink |
| 2015/0181620 A1* | 6/2015 | Seok ................. H04W 74/0816 370/311 |

FOREIGN PATENT DOCUMENTS

| | | |
|---|---|---|
| CN | 103002544 A | 3/2013 |
| JP | 2004320654 A | 11/2004 |
| JP | 2013165516 A | 6/2013 |
| KR | 20100084141 A | 7/2010 |
| KR | 20130079624 A | 7/2013 |
| WO | WO-2001022686 A1 | 3/2001 |
| WO | WO-2006106450 A1 | 10/2006 |
| WO | WO-2007143739 | 12/2007 |
| WO | WO-2010017494 A1 | 2/2010 |
| WO | WO-2012092848 A1 | 7/2012 |
| WO | WO-2013037327 A1 | 3/2013 |
| WO | WO-2013106745 A1 | 7/2013 |

OTHER PUBLICATIONS

Michelle X. Gong et al ("Directional CSMA/CA Protocol with Spatial Reuse for mmWave Wireless Networks"), Globecom 2010, 2010 IEEE Global Telecommunications Conference, IEEE, Piscataway, NJ, USA, Dec. 6, 2010, pp. 1-5, XP031846733, ISBN: 978-1-4244-5636-9 (Year: 2010).*

"Directional CSMA/CA protocol with Spatial Reuse for mmWave Wireless Networks"—Michelle (Year: 2010).*

Giladi, Ran.; "Network Processors—Architecture, Programming, and Implementation", Jul. 16, 2008 (Jul. 16, 2008), Morgan Kaufmann, ISBN: 978-0-12-370891-5, Chapter 5; Paragraph "5.4.1 Parsing"; p. 196.

Gross J, et al., "Enhancing IEEE 802.11a/n with dynamic single-user OFDM adaptation", Performance Evaluation, Amsterdam, NL, vol. 66, No. 3-5, Mar. 1, 2009 (Mar. 1, 2009), pp. 240-257, XP025923721.

IEEE 802.11; Part 11: Wireless LAN Medium Access Control (MAC) and Physical Layer (PHY) Specifications (Revision of IEEE STD 802.11-1999) (2007); pp. 1-914.

IEEE P802.11ac/D0.1, Draft Standard for Information Technology—Telecommunications and information exchange between systems—Local and metropolitan area networks—Specific requirements Part 11 : Wireless LAN Medium Access Control (MAC) and Physical Layer (PHY) specifications. Amendment 5: Enhancements for Very High Throughput for Operation in Bands below 6 GHz, Jan. 2011, pp. 1-193.

"IEEE Standard for Information Technology—Telecommunications and information exchange between systems—Local and metropolitan area networks—Specific requirements Part 11: Wireless LAN Medium Access Control (MAC) and Physical Layer (PHY) Specifications Amendment 5: Enhancements for Higher Throughput", IEEE Standard, IEEE, Piscataway, NJ, USA, Oct. 29, 2009 (Oct. 29, 2009), pp. 1-502, XP017604244, ISBN: 978-0-7381-6046-7.

IEEE standards association, "Use of the IEEE assigned Organizationally Unique Identifier with ANSI/IEEE Std 802-2001 Local and Metropolitan Area Networks", Nov. 2, 2001, ANSI/IEEE STD 802-2001 Local and Metropolitan Area Networks Tutorial Rev. Nov02; 3 pages.

Jeong, K., et al., "Overlay Transmission System on Wireless LAN with RTS/CTS Exchange Taking into Account Timing Synchronization", IEICE Transactions on Communications, Communications Society, Tokyo, JP, vol. E93B, No. 3, Mar. 1, 2010 (Mar. 1, 2010), pp. 640-649, XP001555317.

(56) References Cited

OTHER PUBLICATIONS

Kim J., et al., "GroupID Concept for Downlink MU-MIMO Transmission", IEEE 802.11-10/0073r2, IEEE mentor, Mar. 2010 Slide Show; pp. 1-10.
Butti L., et al., "Discovering and exploiting 802.11 wireless driver vulnerabilities", Journal in Computer Virology, vol. 4, No. 1, Sep. 29, 2007 (Sep. 29, 2007), pp. 25-37, XP002665765.
Morioka Y., et al., "Why we need Length Field in VHT SIG", IEEE 802.11-10/0627r00, IEEE mentor, pp. 1-12, May 17, 2010.
Van Nee, R., "Breaking the Gigabit-per-second barrier with 802.11AC", IEEE Wireless Communications, IEEE Service Center, Piscataway, NJ, US, vol. 18, No. 2, Apr. 1, 2011 (Apr. 1, 2011), p. 4, XP011354039.
Sampath H., et al: "802.11 ac Preamble", Internet Citation, Jul. 13, 2010 (Jul. 13, 2010), pp. 1-17, XP002657958.
Ting, et al., "Design and Analysis of Grouping-Based DCF (GB-DCF) Scheme for the MAC layer Enhancement of 802.11 and 802.11n," Proceedings of the 9th ACM international symposium on Modeling analysis and simulation of wireless and mobile systems, 2006, pp. 255-264.
Kamath, Vasudev: "Parsing the captured packets: Packet Sniffer", Apr. 29, 2009 (Apr. 29, 2009), [retrieved on Nov. 29, 2012]; 2 pages.
Yun J-H., et al., "New Hidden Station Detection Scheme for Adaptive RTS/CTS Exchange in IEEE 802.11 WLANS", IEICE Transactions on Communications, Communications Society, Tokyo, JP, vol. E90B, No. 10, Oct. 1, 2007 (Oct. 1, 2007), pp. 2827-2835, XP001508611.

Zhang H et al., "802.11ac Preamble", IEEE 802.11-10/0070R0, [Online] Jan. 18, 2010 (Jan. 18, 2010), pp. 1-11, XP002610760.
Hart B., et al., "GAPA—Efficient, More Reliable Multicast," IEEE 802.11-08/0533r1, IEEE mentor, May 12, 2008; pp. 1-13.
Kim J., et al., "GroupID Concept for Downlink MU-MIMO Transmission", IEEE 802.11-10/0073R1, [Online] Jan. 19, 2010, pp. 1-8.
Park J., et al., "802.11ac MAC Frame Length Indication," IEEE 802.11-10/0358r0, IEEE mentor, Mar. 16, 2010; pp. 1-10.
Asterjadhi A. et al., "Comment Resolution for Subclauses 9.3.2", IEEE P802.11 Wireless LANs; IEEE-SA Mentor, Piscataway, NJ USA, doc.: IEEE 802.11-13.9715r1, Jul. 18, 2013 (Jul. 18, 2013), pp. 1-4, XP068054437.
Ghosh C. et al., "Comment Collection 09 MAC CIDs (Comment Resolutions for CC09)", IEEE P802.11 Wireless LANs, IEEE-SA Mentor, Piscataway, NJ USA, doc.: IEEE P802.11-13/0813r0, Jul. 15, 2013 (Jul. 15, 2013), pp. 1-22, XP068054432.
Gong, et al., "Directional CSMA/CA protocol with spatial reuse for mmWave wireless networks," IEEE Global Telecommunications Conference (GLOBECOM), Dec. 2010, pp. 1-5.
International Search Report and Written Opinion—PCT/US2014/062567—ISA/EPO—dated Jan. 29, 2015.
Nishide K, et al., "Transport-level fairness provisioning in wireless local area networks with hidden stations", IEEE 20th International Symposium on Personal, Indoor and Mobile Radio Communications (PIMRC 2009), IEEE, Piscataway, NJ, USA, Sep. 13, 2009 (Sep. 13, 2009), pp. 1158-1162, XP031659609.
Fischer M., et al., "Inter-bss-address-3-contents", IEEE 802.11-09/0401r2, IEEE mentor, Mar. 2009, 6 pages.
Ponnampalam V., et al., "11ac Auto-detection using the VHT-SIGA Field", IEEE 802.11-10/0750r1, IEEE mentor, Jul. 2010, 14 pages.

* cited by examiner

900

902

TRANSMIT A MESSAGE INCLUDING A FIRST INDICATION FOR A FIRST SUBSET OF WIRELESS DEVICES OF THE PLURALITY OF WIRELESS DEVICES TO SET A NETWORK ALLOCATION VECTOR (NAV) AND FURTHER INCLUDING A SECOND INDICATION FOR A SECOND SUBSET OF WIRELESS DEVICES OF THE PLURALITY WIRELESS DEVICES TO NOT SET THE NAV, THEREBY RESERVING ACCESS TO THE WIRELESS MEDIUM FOR AT LEAST THE SECOND SUBSET OF THE PLURALITY OF WIRELESS DEVICES

FIG. 9

SYSTEMS AND METHODS FOR IMPROVED COMMUNICATION EFFICIENCY IN HIGH EFFICIENCY WIRELESS NETWORKS

CROSS REFERENCE TO RELATED APPLICATIONS

This application claims priority under 35 U.S.C. § 119(e) to U.S. Provisional Patent Application No. 61/897,135 entitled "SYSTEMS AND METHODS FOR IMPROVED COMMUNICATION EFFICIENCY IN HIGH EFFICIENCY WIRELESS NETWORKS" filed on Oct. 29, 2013 the disclosure of which is hereby incorporated by reference in its entirety. This application further claims priority under 35 U.S.C. § 119(e) to U.S. Provisional Patent Application No. 61/924,156, entitled "SYSTEMS AND METHODS FOR IMPROVED COMMUNICATION EFFICIENCY IN HIGH EFFICIENCY WIRELESS NETWORKS," filed Jan. 6, 2014, assigned to the assignee hereof and incorporated herein by reference in its entirety. This application further claims priority under 35 U.S.C. § 119(e) to U.S. Provisional Patent Application No. 61/928,845, entitled "SYSTEMS AND METHODS FOR IMPROVED COMMUNICATION EFFICIENCY IN HIGH EFFICIENCY WIRELESS NETWORKS," filed Jan. 17, 2014, assigned to the assignee hereof and incorporated herein by reference in its entirety.

BACKGROUND

Field

Certain aspects of the present disclosure generally relate to wireless communications, and more particularly, to methods and apparatus for selectively blocking communications in wireless networks.

Background

In many telecommunication systems, communications networks are used to exchange messages among several interacting spatially-separated devices. Networks may be classified according to geographic scope, which could be, for example, a metropolitan area, a local area, or a personal area. Such networks may be designated respectively as a wide area network (WAN), metropolitan area network (MAN), local area network (LAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infrared, optical, etc. frequency bands. Wireless networks advantageously facilitate user mobility and rapid field deployment when compared to fixed wired networks.

The devices in a wireless network may transmit/receive information between each other. The devices may communicate at different data rates. Where many devices share a communication network and there are large differences between the communication rates of the devices network, congestion and inefficient link usage may result. As such, systems, methods, and non-transitory computer-readable media are needed for improving communication efficiency in high efficiency wireless networks.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides a method of reserving access to a wireless communication medium for a plurality of wireless devices. The method comprising transmitting a message including a first indication for a first subset of wireless devices of the plurality of wireless devices to set a network allocation vector (NAV) and further including a second indication for a second subset of wireless devices of the plurality wireless devices to not set the NAV, thereby reserving access to the wireless medium for at least the second subset of the plurality of wireless devices.

Another aspect of the disclosure provides a method of wireless communication. The method comprising transmitting a message instructing receiving wireless devices to wait for an indicated number of time slots where the medium is idle before trying to access the medium.

Another aspect of the disclosure provides an apparatus for wireless communication. The apparatus comprising a processor configured to generate a message a first indication for a first subset of wireless devices of a plurality of wireless devices to set a network allocation vector (NAV) and further including a second indication for a second subset of wireless devices of the plurality wireless devices to not set the NAV. The apparatus further comprising a transmitter configured to transmit the message, thereby reserving access to a wireless medium for at least the second subset of the plurality of wireless devices.

Another aspect of the disclosure provides an apparatus for wireless communication. The apparatus comprising a processor configured to generate a message instructing receiving wireless devices to wait for an indicated number of time slots where the medium is idle before trying to access the medium. The apparatus further comprising a transmitter configured to transmit the message.

Another aspect of the disclosure provides an apparatus for wireless communication. The apparatus comprising means for generating a message including a first indication for a first subset of wireless devices of a plurality of wireless devices to set a network allocation vector (NAV) and further including a second indication for a second subset of wireless devices of the plurality wireless devices to not set the NAV. The apparatus further comprising means for transmitting the message, thereby reserving access to a wireless medium for at least the second subset of the plurality of wireless devices.

Another aspect of the disclosure provides an apparatus for wireless communication. The apparatus comprising means for generating a message instructing receiving wireless devices to wait for an indicated number of time slots where the medium is idle before trying to access the medium. The apparatus further comprising means for transmitting the message.

Another aspect of the disclosure provides a non-transitory computer readable medium. The medium comprising code that when executed causes an apparatus to transmit a message including a first indication for a first subset of wireless devices of a plurality of wireless devices to set a network allocation vector (NAV) and further including a second indication for a second subset of wireless devices of the plurality wireless devices to not set the NAV, thereby reserving access to a wireless medium for at least the second subset of the plurality of wireless devices.

Another aspect of the disclosure provides a non-transitory computer readable medium. The medium comprising code that when executed causes an apparatus to transmit a message instructing receiving wireless devices to wait for an indicated number of time slots where the medium is idle before trying to access the medium.

BRIEF DESCRIPTION OF THE DRAWINGS

FIG. 9 is a flow chart of an aspect of an exemplary method for providing wireless communication.

DETAILED DESCRIPTION

Figure 1:
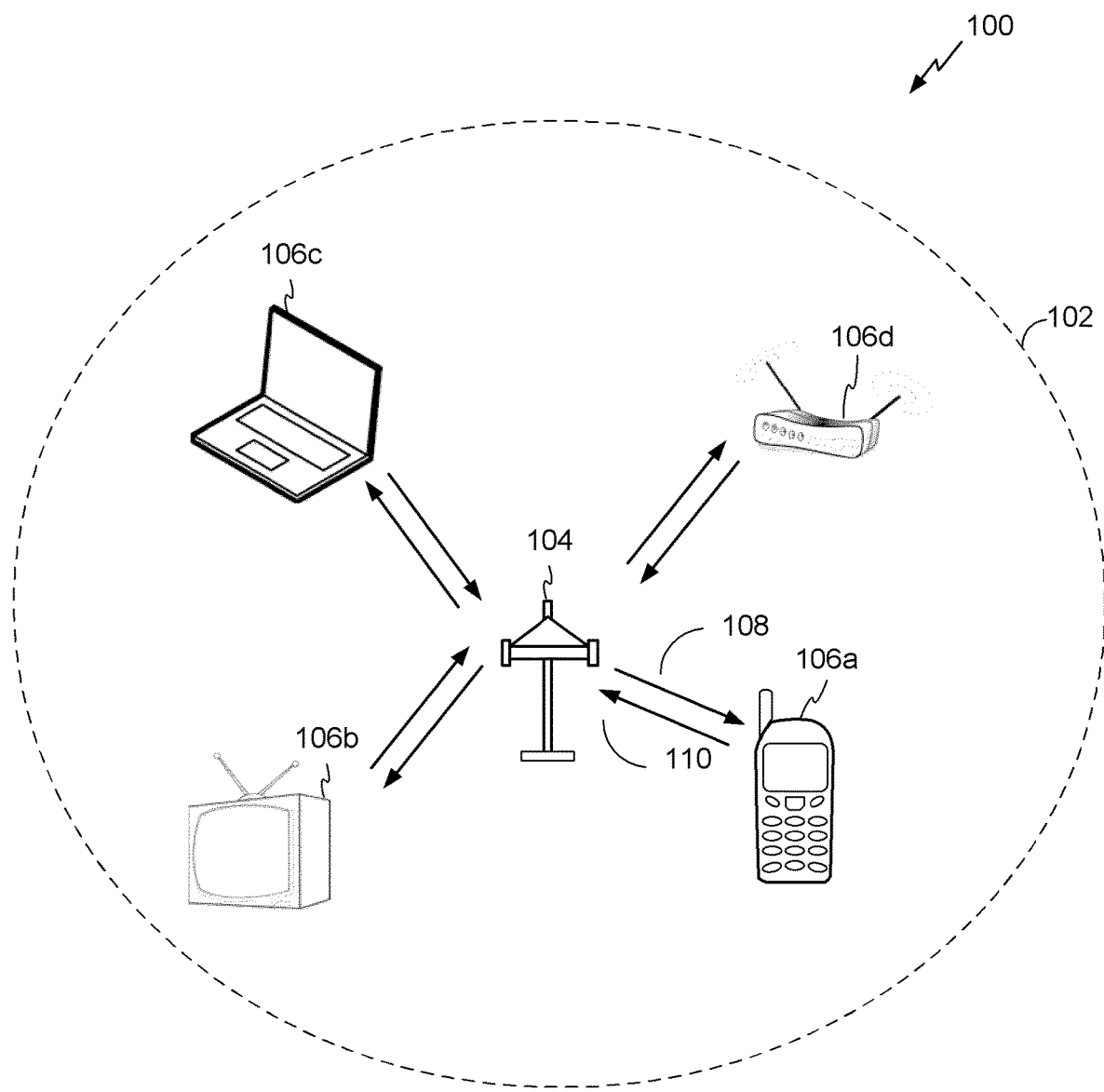
FIG. 1 illustrates an example of a wireless communication system in which aspects of the present disclosure may be employed.

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless network technologies may include various types of wireless local area networks (WLANs). A WLAN may be used to interconnect nearby devices together, employing widely used networking protocols. The various aspects described herein may apply to any communication standard, such as Wi-Fi or, more generally, any member of the IEEE 802.11 family of wireless protocols.

In some aspects, wireless signals may be transmitted according to a high-efficiency 802.11 protocol using orthogonal frequency-division multiplexing (OFDM), direct-sequence spread spectrum (DSSS) communications, a combination of OFDM and DSSS communications, or other schemes. Implementations of the high-efficiency 802.11 protocol may be used for Internet access, sensors, metering, smart grid networks, or other wireless applications. Advantageously, aspects of certain devices implementing this particular wireless protocol may consume less power than devices implementing other wireless protocols, may be used to transmit wireless signals across short distances, and/or may be able to transmit signals less likely to be blocked by objects, such as humans.

In some implementations, a WLAN includes various devices which are the components that access the wireless network. For example, there may be two types of devices: access points ("APs") and clients (also referred to as stations, or "STAs"). In general, an AP serves as a hub or base station for the WLAN and an STA serves as a user of the WLAN. For example, a STA may be a laptop computer, a personal digital assistant (PDA), a mobile phone, etc. In an example, an STA connects to an AP via a Wi-Fi (e.g., IEEE 802.11 protocol such as 802.11ah) compliant wireless link to obtain general connectivity to the Internet or to other wide area networks. In some implementations an STA may also be used as an AP.

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to concurrently transmit data belonging to multiple user terminals. A TDMA system may allow multiple user terminals to share the same frequency channel by dividing the transmission signal into different time slots, each time slot being assigned to different user terminal. A TDMA system may implement GSM or some other standards known in the art. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An OFDM system may implement IEEE 802.11 or some other standards known in the art. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA. A SC-FDMA system may implement 3GPP-LTE (3rd Generation Partnership Project Long Term Evolution) or other standards.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

A station ("STA") may also comprise, be implemented as, or known as a user terminal, an access terminal ("AT"), a subscriber station, a subscriber unit, a mobile station, a remote station, a remote terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, certain of the devices described herein may implement the 802.11ah standard, for example. Such devices, whether used as an STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

FIG. 1 illustrates an example of a wireless communication system 100 in which aspects of the present disclosure may be employed. The wireless communication system 100 may operate pursuant to a wireless standard, for example at least one of the 802.11ah, 802.11ac, 802.11n, 802.11g and 802.11b standards. The wireless communication system 100 may include an AP 104, which communicates with STAs 106.

A variety of processes and methods may be used for transmissions in the wireless communication system 100 between the AP 104 and the STAs 106. For example, signals may be transmitted and received between the AP 104 and the STAs 106 in accordance with OFDM/OFDMA techniques. If this is the case, the wireless communication system 100 may be referred to as an OFDM/OFDMA system. Alternatively, signals may be transmitted and received between the AP 104 and the STAs 106 in accordance with CDMA techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel.

The AP 104 may provide wireless communication coverage in a basic service area (BSA) 102. The AP 104 along with the STAs 106 associated with the AP 104 and that use the AP 104 for communication may be referred to as a basic service set (BSS). It should be noted that the wireless communication system 100 may not have a central AP 104, but rather may function as a peer-to-peer network between the STAs 106. Accordingly, the functions of the AP 104 described herein may alternatively be performed by one or more of the STAs 106.

Figure 2:
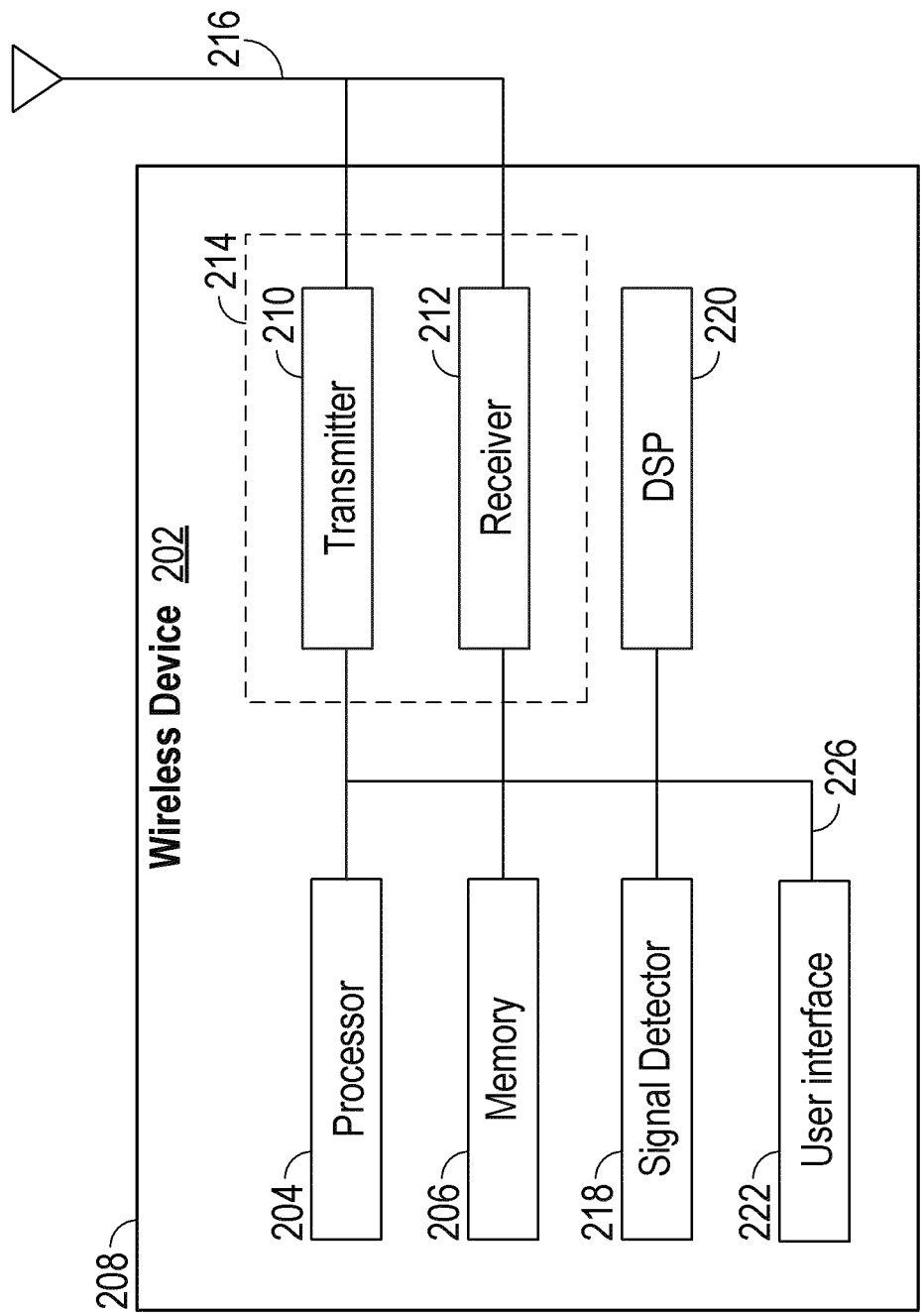
FIG. 2 illustrates various components that may be utilized in a wireless device that may be employed within the wireless communication system of FIG. 1.

FIG. 2 illustrates various components that may be utilized in a wireless device 202 that may be employed within the wireless communication system 100. The wireless device 202 is an example of a device that may be configured to implement the various methods described herein. For example, the wireless device 202 may comprise the AP 104 or one of the STAs 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas, which may be utilized during MIMO communications, for example.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a data unit for transmission. In some aspects, the data unit may comprise a physical layer data unit (PPDU). In some aspects, the PPDU is referred to as a packet.

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The various components of the wireless device 202 may be coupled together by a bus system 226. The bus system 226 may include a data bus, for example, as well as a power bus, a control signal bus, and a status signal bus in addition to the data bus. Those of skill in the art will appreciate the components of the wireless device 202 may be coupled together or accept or provide inputs to each other using some other mechanism.

Although a number of separate components are illustrated in FIG. 2, those of skill in the art will recognize that one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements.

As discussed above, the wireless device 202 may comprise an AP 104 or an STA 106, and may be used to transmit and/or receive communications. The communications exchanged between devices in a wireless network may include data units which may comprise packets or frames. In some aspects, the data units may include data frames, control frames, and/or management frames. Data frames may be used for transmitting data from an AP and/or a STA to other APs and/or STAs. Control frames may be used together with data frames for performing various operations and for reliably delivering data (e.g., acknowledging receipt of data, polling of APs, area-clearing operations, channel acquisition, carrier-sensing maintenance functions, etc.). Management frames may be used for various supervisory functions (e.g., for joining and departing from wireless networks, etc.).

Certain aspects of the present disclosure support allowing APs 104 to schedule STAs 106 transmissions in optimized ways to improve efficiency. In some embodiments high efficiency wireless (HEW) stations may be defined as stations utilizing an 802.11 high efficiency protocol (e.g., 802.11ax or later developed protocol). Both HEW stations and stations using older or legacy 802.11 protocols (e.g., 802.11b), may compete for access to a wireless medium. The high-efficiency 802.11 protocol described herein may allow for devices to operate under a modified mechanism that differentiates between devices that can communicate concurrently and devices that cannot communicate concurrently. Accordingly, in the case of apartment buildings or densely-populated public spaces, APs and/or STAs that use the high-efficiency 802.11 protocol may experience reduced latency and increased network throughput even as the number of active wireless devices increases, thereby improving user experience.

In some embodiments, APs 104 may control access to a wireless medium by transmitting a message using a transmission characteristic such that at least the wireless devices to be silenced can decode the message and a second group of wireless devices may access the medium for transmissions. In some embodiments the message may include a first indication for the first group to set their network allocation vector (NAV) (e.g., be silenced). In some embodiments, the message may include a second indication for the second group of devices to not set their NAV (e.g., access the medium). For example, with respect to FIG. 1, STAs 106a and 106b may be legacy STAs and 106c and 106d may be HEW STAs. In this embodiment, it may be desirable to silence the STAs 106a and 106b so that the STAs 106c and 106d may communicate with the AP 104 without interference from legacy STAs 106a and 106b. Thus, the transmission characteristic may be such that at least the STAs 106a and 106b may decode the message. When the STAs 106a and 106b detect the message, the STAs 106a and 106b may be silenced for the interval as identified by the duration field within the message. The duration field of the message may be set such that a predetermined percentage of a total communication time is reserved for the STAs 106c and 106d to communicate. The STAs 106c and 106d may also be able to decode the message but may receive an instruction to not set their network allocation vector (NAV) and thus not be silenced for the interval identified in the duration field of the message.

In some aspects, an AP 104 or a STA 106 may transmit a message with a transmission characteristic that reserves the medium for only HEW STAs or a group of HEW STAs by sending a message comprising a first indication that sets the NAV for the legacy STAs and a second indication that does not set the NAV for the HEW STAs. In other aspects, an AP 104 or a STA 106 may transmit a message with a transmission characteristic that reserves the medium for only legacy STAs or a group of legacy STAs by sending a message with a first indication that sets the NAV of the HEW STAs and a second indication that does not set the NAV for the legacy STAs. This would allow the AP 104 to more efficiently allocate access to the medium between the HEW STAs and the legacy STAs.

In one embodiment, the first indication may be a first frame with a first physical layer frame format. The first physical layer frame format may comprise first type field and a first subtype field. In this implementation, with respect to FIG. 1, the STAs 106a and 106b may be operating in a mode according to a legacy IEEE 802.11 standard (e.g., IEEE 802.11b) and STAs 106c and 106d may be operating in a mode according to a IEEE 802.11 high efficiency protocol. In one embodiment, the first physical layer frame may have a similar structure as an 802.11b (or similar protocol) frame such that legacy STAs 106a and 106b may be able to decode the NAV for the first frame irrespective of the first type field and first subtype field. The STAs 106a and 106b may then set their NAV according to the first frame.

The HEW STAs 106c and 106d, on the other hand, may decode the first frame but determine that for this first physical layer frame type, as indicated by the type or subtype field (e.g., second indication), they may ignore the NAV for the first frame and thus may send transmissions during the time indicated by the duration field of the first frame. In some embodiments, the first physical layer frame format may be only decodable by one group of STAs (i.e. the first frame is not decodable by legacy stations). In this implementation, with respect to FIG. 1, the STAs 106a and 106b may be operating in a mode according to a legacy IEEE 802.11 standard (i.e. IEEE 802.11b) and STAs 106c and 106d may be operating in a mode according to a IEEE 802.11 high efficiency protocol. In this embodiment, the first physical layer frame may only be decodable by STAs 106c and 106d and may comprise the first indication. The STAs 106c and 106d may then set their NAV according to the first physical layer frame while the STAs 106a and 106b may be unable to decode the first physical layer frame and thus may send transmissions as if medium was idle. Accordingly, the first physical layer frame may also comprise the second indication for STAs 106a and 106b to not set the NAV. In some embodiments, the first physical layer frame may also indicate a group of HEW STAs that may set their NAV or a group of HEW stations that may ignore the NAV, which may reserve the medium for a certain group of HEW stations. For example, the first physical layer frame may include the first indication that STA 106c should set its NAV and include a second indication that STA 106d may ignore the NAV and transmit freely. In some aspects the first physical layer frame format may be similar to the format of a request to send (RTS), clear to send (CTS) or a QoS null frame.

In some embodiments, the first indication may be information in a field of an existing frame format. In one aspect, the AP 104 may transmit a clear-to-send (CTS) to self frame. In one embodiment, the AP 104 may set the receiver address (RA) of the CTS frame to a multicast address or to a specific medium access control (MAC) address as the second indication for a first group of STAs to ignore the NAV of the CTS frame while a second group of STAs may set their NAV according to the time duration of a time duration field CTS frame (e.g., first indication). For example, with respect to FIG. 1, STAs 106a and 106b may be legacy STAs and 106c and 106d may be HEW STAs. The STAs 106a and 106b may set their NAV according to the value of the duration field of the CTS, while the HEW STAs 106c and 106d, on the other hand, may see the RA multicast address as the second indication to not set their NAV and may thereby be able to transmit during the duration of the CTS. In another embodiment, the AP 104 may set the receiver address (RA) of the CTS frame to a multicast address or to a specific medium access control (MAC) address and use one of the bits in the scrambling sequence in the service field of the CTS frame as the second indication to a first group of STAs to ignore the NAV of the CTS frame while a second set of STAs may set their NAV according to the first indication, e.g., the duration field of the CTS frame.

In another aspect, the AP 104 may transmit a request to send (RTS) frame. In one embodiment, the AP 104 may define the second indication by setting the transmitter address (TA) to a multicast address and use one of the bits in the scrambling sequence in the service field of the RTS to indicate to a first group of STAs to ignore the NAV of the RTS frame while a second group of STAs may set their NAV according to the time duration of a time duration field of the RTS frame (e.g., first indication). For example, with respect to FIG. 1, STAs 106a and 106b may be legacy STAs and 106c and 106d may be HEW STAs. The STAs 106a and 106b may set their NAV according to the RTS, while the HEW STAs 106c and 106d, on the other hand, may see the TA multicast address and the use of the one bit in the service field as an indication to not set their NAV and may thereby be able to transmit during the duration of the RTS. In other embodiments, the AP 104 may transmit any data or management frame and set the TA to a multicast address and use one of the bits in the scrambling sequence in the service field of the data or management frame as the second indication to indicate to a first group of STAs to ignore the NAV of the data or management frame while a second group of STAs may set their NAV according to the first indication, e.g., the duration field of the data or management frame.

In another aspect, an AP 104 or a STA 106 may transmit a quality of service (QoS) frame. In one embodiment, the AP 104 may use a one bit indication in the reserved bits of the QoS control field as the second indication to indicate to a first group of STAs to ignore the NAV of the QoS frame while a second group of STAs may set their NAV according to the first indication, e.g., the duration field of the QoS frame. For example, with respect to FIG. 1, STAs 106a and 106b may be legacy STAs and 106c and 106d may be HEW STAs. The STAs 106a and 106b may see the first indication (e.g., the value in the duration field of the QoS) and set their NAV according to the duration field of the QoS, while the HEW STAs 106c and 106d, on the other hand, may see the one bit indication in the control field as the second indication to not set their NAV and may thereby be able to transmit during the duration of the QoS.

In another aspect, the AP 104 may transmit a control wrapper frame. In some embodiments the control wrapper frame may carry an RTS or CTS frame. In one embodiment, the AP 104 may use an invalid field setting in the high throughput control field of the control wrapper frame as the second indication to indicate to a first group of STAs to ignore the NAV of the control wrapper frame while a second group of STAs may set their NAV according to the time duration of a time duration field of the control wrapper frame (e.g., first indication). For example, with respect to FIG. 1, STAs 106a and 106b may be legacy STAs and 106c and 106d may be HEW STAs. The STAs 106a and 106b may set their NAV according to the first indication, the duration field of the control wrapper frame (with a RTS, CTS, or other frame), while the HEW STAs 106c and 106d, on the other hand, may see the invalid field settings in the high throughput control field as the second indication and not set their NAV and may thereby be able to transmit during the duration of the control wrapper frame.

In one embodiment, the first and second indication may be based on information in a protocol version field. In this embodiment, the AP 104 may transmit a frame with a protocol version field set a value greater than zero that may comprise the first indication to a first group of STAs to set the NAV according to the time duration in a duration field of the frame while a second group of STAs may not be able to decode the frame and thus the value of the protocol version field may comprise the second indication to not set their NAV. For example, with respect to FIG. 1, STAs 106a and 106b may be legacy STAs and 106c and 106d may be HEW STAs. The STAs 106a and 106b may not be able to decode a frame with a protocol version field set to a value greater than zero, while the HEW STAs 106c and 106d, on the other hand, may be able to decode this frame and may set their NAV according to the duration field of the frame. Thus, the STAs 106a and 106b may be able to transmit during the duration of the frame.

In another embodiment, the first indication may comprise information in a duration field. In this embodiment, the AP 104 may transmit a frame with a duration field set to an invalid time duration value that may comprise the first indication and may be decodable by a first group of STAs to set the NAV according to the frame while a second group of STAs may not be able to decode the frame and thus the invalid time duration value may comprises the second indication and the second group of STAs may not set their NAV. In some embodiments, the duration field may only accept values between 0 and a maximum number or between another defined range of values. An invalid duration field value may comprise a value outside the defined range of acceptable values. For example, with respect to FIG. 1, STAs 106a and 106b may be legacy STAs and 106c and 106d may be HEW STAs. The STAs 106a and 106b may not be able to decode a frame with a duration field set to an invalid value, while the HEW STAs 106c and 106d, on the other hand, may be able to decode this frame and may set their NAV according to the frame. Thus, the STAs 106a and 106b may be able to transmit during the duration of the frame.

In another embodiment, the first indication may comprise information in a field of an existing frame format. In one embodiment, the AP 104 may transmit a second frame with the second indication made by including a duration field set to zero. The second frame may include a second field, such that the second field may comprise the first indication by a first group of STAs to set the NAV according to the second field of the second frame while a second group of STAs may not be able to decode the second field in the frame and thus may not set their NAV. For example, with respect to FIG. 1, STAs 106a and 106b may be legacy STAs and 106c and 106d may be HEW STAs. The STAs 106a and 106b may not be able to decode the second field and the duration field set to zero would comprise the second indication for the STAs 106a and 106b to not set their NAV, while the HEW STAs 106c and 106d, on the other hand, may be able to decode the second field in the second frame and the second field may comprise the first indication for the HEW STAs 106c and 106d to set their NAV according to the new field. Thus, the STAs 106a and 106b may be able to transmit during the duration of the frame.

In some embodiments, the AP 104 or the STA 106 may subsequently transmit a message comprising a third indication for a third subset of wireless devices of the plurality of wireless devices to reset the NAV and further including a fourth indication for a fourth subset of the plurality of wireless devices to not reset the NAV. In some aspects, the third indication may be such that only HEW STAs or a group of HEW STAs may reset the NAV and the fourth indication may be such that the legacy STAs do not reset their NAV. In other aspects, the third indication may be such that only legacy STAs or a group of legacy STAs may reset their NAV and the fourth indication may be such that the HEW STAs do not reset their NAV. This would allow the AP 104 to more efficiently allocate access to the medium between the HEW STAs and the legacy STAs.

In one embodiment, the fourth indication may comprise information in a CF-end frame. In this embodiment the AP 104 may transmit a CF-end frame as the third indication and may set the basic service set identifier (BSSID) to a multicast address as the fourth indication to indicate to a first group of STAs to ignore the CF-end frame while a second group of STAs may reset their NAV according to the CF-end frame. For example, with respect to FIG. 1, STAs 106a and 106b may be legacy STAs and 106c and 106d may be HEW STAs. The STAs 106a and 106b may reset their NAV according to the CF-end, while the HEW STAs 106c and 106d, on the other hand, may see the BSSID multicast address as an indication to not reset their NAV.

In another embodiment, the third and fourth indications may be based on a CF-end frame in a modified frame format. In some embodiments, the modified CF-end frame format may be only decodable by one group of STAs. In this implementation, with respect to FIG. 1, the STAs 106a and 106b may be operating in a mode according to a legacy IEEE 802.11 standard (i.e. IEEE 802.11b) and STAs 106c and 106d may be operating in a mode according to a IEEE 802.11 high efficiency protocol. In this embodiment, the modified CF-end frame may comprise the third indication only be decodable by STAs 106c and 106d. The STAs 106c and 106d may then reset their NAV according to the modified CF-end frame while the STAs 106a and 106b may be unable to decode the modified frame and thus the modified CF-end frame may comprise the fourth indication to indicate that the STAs 106c and 106d may not reset their NAV.

In one embodiment, the third and fourth indications may be based on a third frame format with a third type and third subtype, such that the third frame format is not decodable by legacy stations. In this implementation, with respect to FIG. 1, the STAs 106a and 106b may be operating in a mode according to a legacy IEEE 802.11 standard (i.e. IEEE 802.11b) and STAs 106c and 106d may be operating in a mode according to a IEEE 802.11 high efficiency protocol. In one embodiment, the third frame may have a similar structure as an 802.11b (or similar protocol) frame (i.e. a CF-end frame) but STAs 106a and 106b may not be able to decode the third frame and thus the third frame format may comprise the fourth indication to indicate that the STAs 106a and 106b may not reset their NAV. The HEW STAs 106c and 106d, on the other hand, may decode the third frame and determine that this third frame type comprises the third indication and that they may reset the NAV and thus may access the medium.

In some embodiments, an AP 104 or a STA 106 may reserve the medium for variable period of time. In one aspect, the AP 104 or the STA 106 may send a message instructing the STAs to wait an indicated number of time slots before attempting to access the medium. Each STA receiving the message may perform a backoff procedure with a counter initialized at the indicated time slot value. After each time slot, the STAs may check to see if the medium was busy during the time slot. If the medium was busy, the counter may stay at the previous time slot value. If the medium was idle, the counter may decrease by one, and may continue to wait until the counter reaches zero. Thus, the time period the AP 104 or the STA 106 reserves the medium for may depend on the traffic in the medium and may not be a defined value.

Certain aspects of the present disclosure support allowing APs and STAs to selectively set the NAV of certain subsets of nodes using an RTS/CTS exchange in optimized ways to improve efficiency. Generally, wireless networks that use a regular 802.11 protocol (e.g., 802.11a, 802.11b, 802.11ac, 802.11g, 802.11n, etc.) operate under a carrier sense multiple access (CSMA) mechanism for medium access. According to CSMA, devices sense the medium and only transmit when the medium is sensed to be idle. The use of the CSMA mechanism may create inefficiencies because some APs or STAs located inside or outside of a base service area (BSA) may be able to transmit data without interfering with a transmission made by an AP or STA in the BSA. As the number of active wireless devices continues to grow, the inefficiencies may begin to significantly affect network latency and throughput. The RTS/CTS exchange protocol described herein may allow for devices to operate under a modified mechanism that differentiates between devices that can communicate concurrently with the devices that are exchanging the RTS and CTS frames and devices that cannot communicate concurrently. Accordingly, in the case of apartment buildings or densely-populated public spaces, APs and/or STAs that use the modified RTS/CTS protocol discussed herein may experience reduced latency and increased network throughput even as the number of active wireless devices increases, thereby improving user experience.

Figure 3:
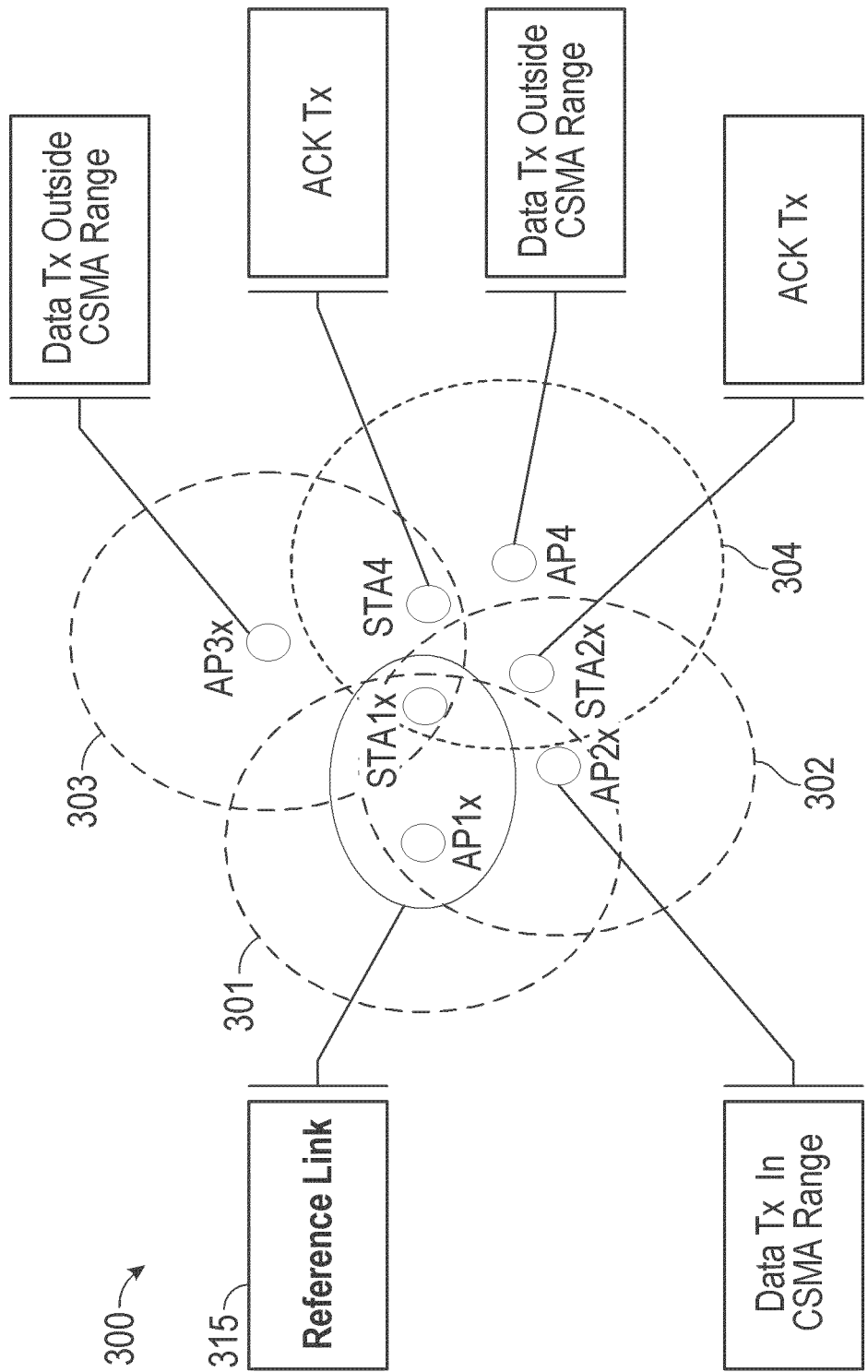
FIG. 3 is a diagram of an exemplary wireless communication system.

FIG. 3 is a diagram of an exemplary wireless communication system 300 for a channel x. In the illustrated embodiment, the wireless communication system 300 includes a plurality of APs (e.g., AP1x, AP2x, AP3x, and AP4), each having a BSA 301-304, and STAs (e.g., STA1x, STA2x, and STA4). In some embodiments the various operations of APs and STAs described herein can be interchanged. For each AP-STA link (e.g., reference link 315) working on channel x, the number of bytes successfully received can be expressed in the following way:

$$f\left(\sum_{ch\,x\,in\,CSMA\,range} Data\ Tx + \sum_{ch\,x\,outside\,CSMA\,range} Data\ Tx + \sum_{ch\,x} ACK\ Tx + \sum_{ch\neq x} Data\ Tx + \sum_{ch\neq x} ACK\ Tx\right)$$

An RTS/CTS exchange may alter the total number of bytes received by effectively the data transmissions (Tx) on the channel x outside the CSMA range and the acknowledgement (ACK) transmissions on channel x to zero. Nodes that send data transmissions (Tx) on the channel x outside the CSMA range and nodes that send acknowledgement (ACK) transmissions on channel x may be considered "jammers" that may cause interference with a given reference link 315 on channel x. Given that RTS/CTS messages silence the nodes receiving the messages, usage of RTS/CTS may decrease system throughput. However, the RTS/CTS exchange may reduce interference and improve reception for a given STA when there are many devices present that may cause interference.

Figure 4:
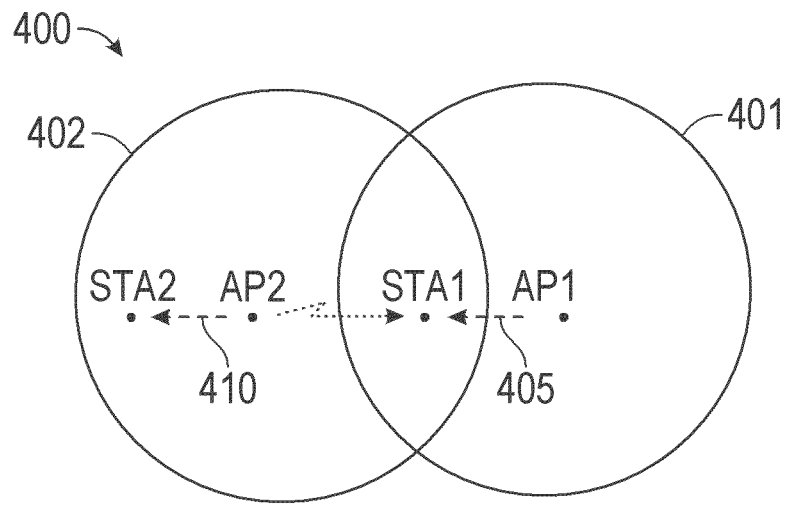
FIG. 4 is a diagram of an exemplary RTS/CTS exchange.

FIG. 4 is a diagram of an exemplary RTS/CTS exchange 400. In conjunction with FIG. 1, in some embodiments, an AP 104 may transmit a RTS frame to a STA 106 and the STA 106 may respond to the RTS frame by sending a CTS frame to the AP 104. An RTS/CTS exchange may be desirable for hidden node mitigation or for clearing the medium when data transmission is not successful for STAs 106. As shown in FIG. 4, the AP1 may transmit an RTS 405 or other message to STA1 with the RTS 405 deferring all STAs and APs within the defer range 401. AP2 is outside the defer range 401, and may be considered a hidden node with respect to the AP1. As shown in FIG. 4, the AP2 may transmit a message 410 to STA2 with its own defer range 402 which may interfere with STA1's reception of the RTS 405 or with its transmission of a responsive CTS frame.

Figure 5:
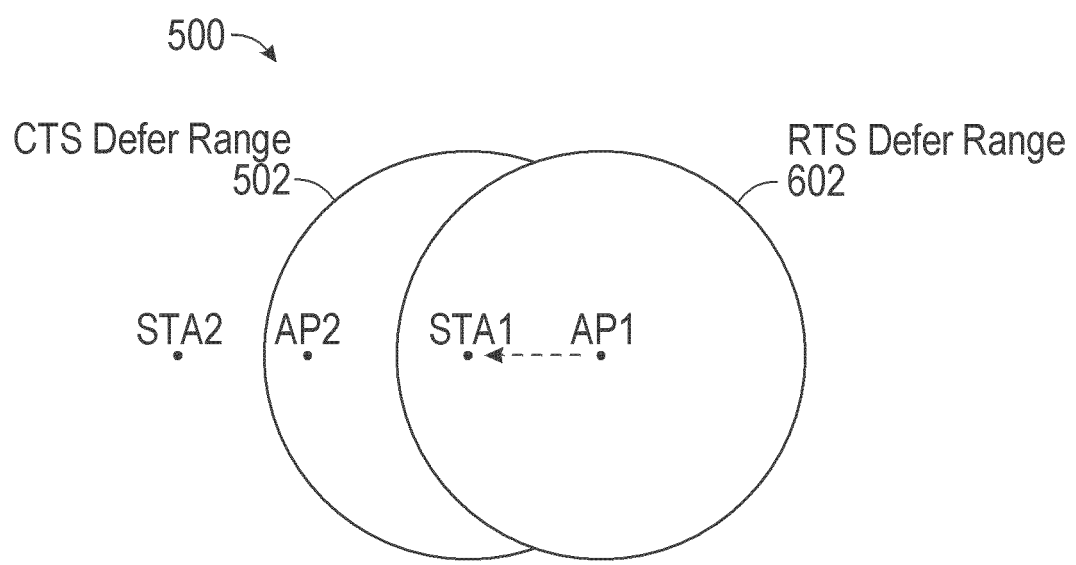
FIG. 5 is a diagram of an exemplary RTS/CTS exchange.
Figure 6:
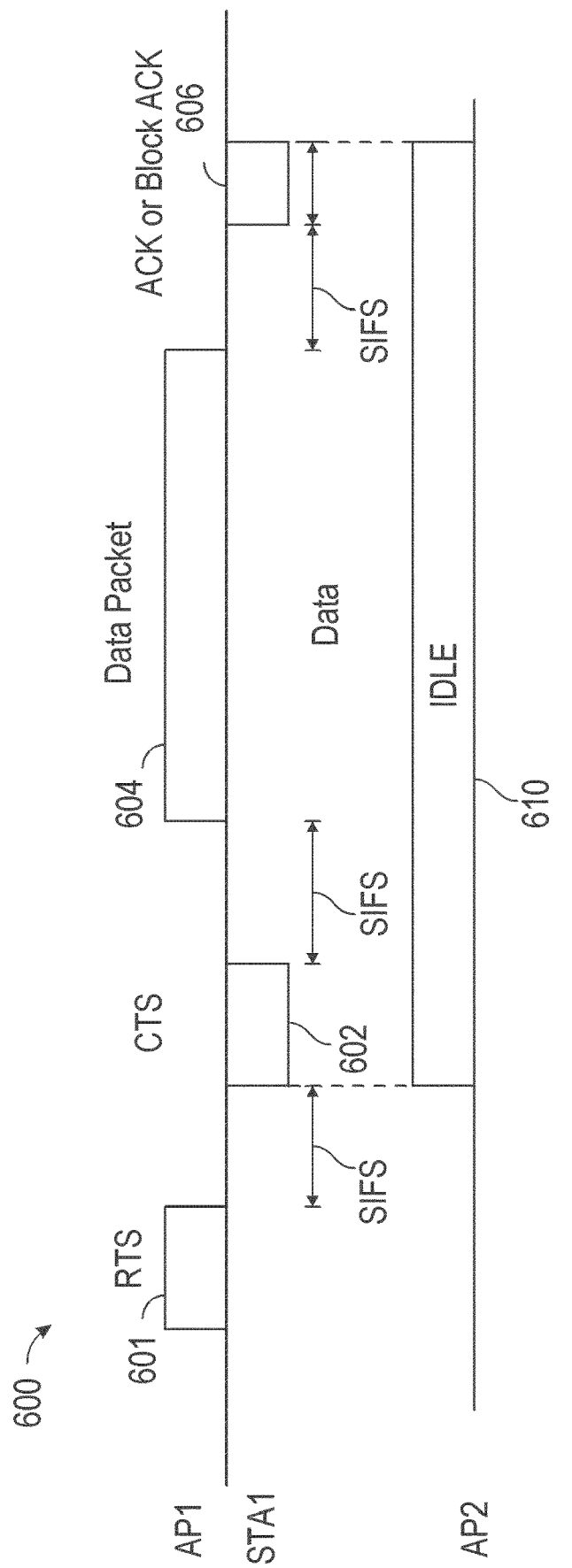
FIG. 6 is a time sequence diagram of the RTS/CTS exchange

FIGS. 5 and 6 illustrate the effects of the RTS/CTS system. FIG. 5 is a diagram 500 of an exemplary RTS/CTS exchange. FIG. 6 is a time sequence diagram 600 of the RTS/CTS exchange of FIG. 5. In FIGS. 5 and 6, the AP1 transmits to STA1 a RTS fame 601 with a defer range 501.

STA1 then responds with a CTS frame 602 with a defer range 502. In conjunction with FIG. 3, the AP2 (hidden node) is then deferred and will remain for the period 610 while the AP1 transmits a data packet 604 to the STA1 and the STA sends an ACK or Block ACK 606. Thus, the RTS 601 and CTS 602 may reserve the medium and prevent interference from any hidden nodes (AP2) during a data transmission 604.

However, if the nodes generate RTS/CTS messages to mitigate the ACK interference effect, the usage of RTS/CTS may be intrusive on the system. For example, N number of jammers may affect a STA (STA1x as shown in FIG. 3). In one aspect, the throughput of the system would equal the sum of the throughputs for all the N jammers ($\Sigma_{j=jammers}$ Thj=Thjammer). The throughput of the system with an RTS/CTS exchange would equal the throughput of the non-silenced stations, STA1x as shown ($\Sigma_{j=non\ silenced\ STA}$Thj=Throughput of STA1x=Thsta). If the AP1x or the STA1x are aware of a number M (N>M) such that of the number N jammers, M jammers should be silenced so that the STA1x may transmit data with a throughput Thsta*. In such a system, the system throughput would equal the throughput of STA1x plus the sum of the throughputs of the non-silenced jammers (e.g., Thsta*+$\Sigma_{j=N-M\ non\ silenced\ jammers}$ Thj>Thjammer>Thsta). An AP 104 or a STA 106 may identify the number of jammers by any conventional means. In some aspects, the AP 104 may perform a scan procedure to identify neighboring basic service sets (BSSs) and the related nodes. In some aspects, the AP 104 can then send a querying message (such as, for example, one or more beacon request messages) to the STA 106 that is the intended recipient of the data (e.g., STA1 is intended recipient of data 604 in FIG. 6). The BSSs heard by the AP 104 and not contained in the querying messages of the STA identify the jammers that should not be silenced (N−M).

Figure 7:
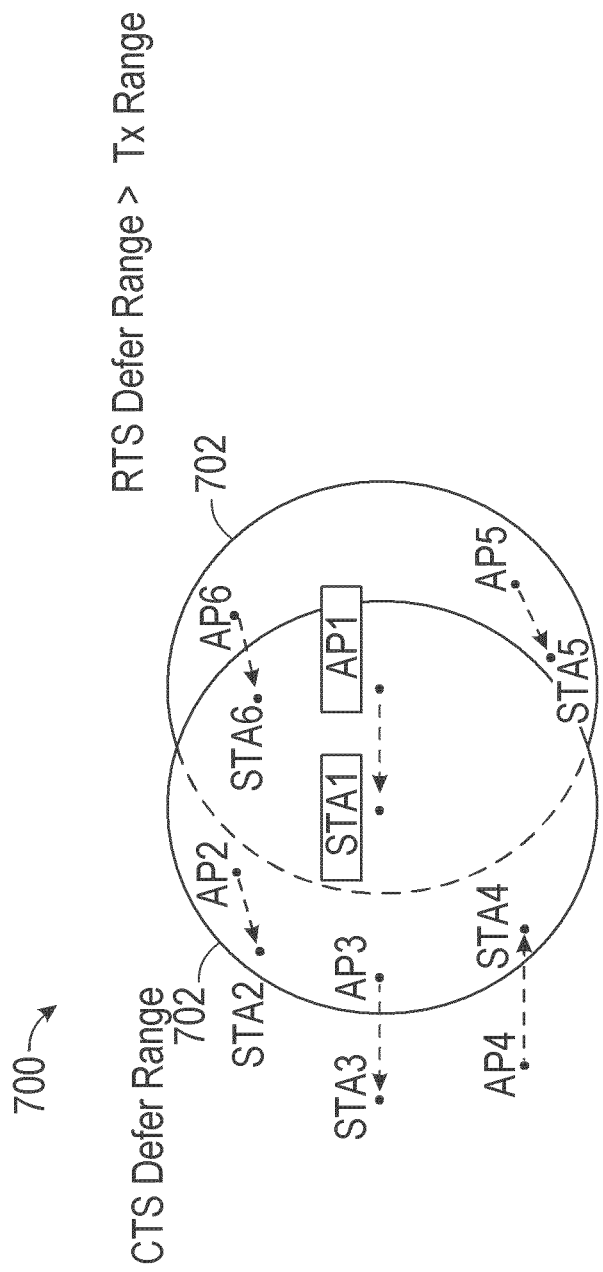
FIG. 7 is a diagram of an exemplary RTS/CTS exchange in a wireless communication system.

In some embodiments, APs 104 or STAs 106 may control access to a wireless medium by transmitting a message using a transmission characteristic such that at least the wireless devices to be silenced can decode the message and a second group of wireless devices may access the medium for transmissions. In some embodiments, the message may be decodable by all wireless devices and may include an instruction that a subset of the wireless of devices be silenced. FIG. 7 is a diagram of an exemplary RTS/CTS exchange in a wireless communication system 700. For example, as shown in FIG. 7, STA1 and AP1 can use an RTS/CTS exchange to selectively silence certain jammers within their respective defer ranges 701 and 702. In this embodiment, it can be desirable to silence the transmissions at AP2, AP3, AP4, and AP6 and allow the transmission at AP5 so that AP5 can communicate with STA5 while AP1 communicates with STA1 without interference from jammer nodes.

In various embodiments, potentially interfering devices or jammers can include devices producing (or capable of producing, or likely to produce) acknowledgement (ACK) interference. For example, as shown in FIG. 7, the AP6 can be a potentially interfering device. In various embodiments herein, jammers, or potentially interfering devices, may be silenced to reduce the possibility of ACK interference.

In some embodiments, AP1 may be aware of the MAC addresses of the jammers. The AP1 may select the jammers to be silenced (e.g., AP2, STA2, AP3, STA4, AP6, and STA6) and insert the list of the silenced jammers in an unused field of the RTS. AP1 then sends the RTS to the destination node, STA1. The STA1 then inserts the same list of the silenced jammers in an unused field of a CTS sends the CTS to the AP1 in response to the RTS. If a node in the wireless system finds its MAC address in the list contained in the received RTS or CTS (e.g., AP2, STA2, AP3, STA4, AP6, and STA6), it sets its NAV to the value contained in the RTS or CTS. Accordingly, the list of MAC addresses may comprise the first indication for the nodes included in the list of MAC addresses to set the NAV. If a node does not find its MAC address in the list contained in the received RTS or CTS, it does not set its NAV to the value contained in the RTS or CTS.

In some embodiments, and with reference to FIG. 7, AP1 may be aware of the MAC addresses of the jammers. The AP1 may select the jammers to be silenced and associate the list of MAC addresses of the silenced jammers to an identifier (e.g., group identifier) and communicates the identifier to the STAs. Such communication can be done over the air or through an out of band mechanism (e.g., an inter AP communication). AP1 then inserts the group identifiers of the STAs to be silenced in the RTS and sends the RTS to the destination node, STA1. The STA1 then copies the received group identifiers and inserts the same group identifiers of the silenced jammers in an unused field of a CTS sends the CTS to the AP1 in response to the RTS. If a node in the wireless system belongs to the group whose group identifier is contained in the received RTS or CTS, it sets its NAV to the value contained in the RTS or CTS. Accordingly, the group identifier may comprise the first indication for the nodes included in the group identifier to set the NAV. If a node does not belong to the group whose group identifier is contained in the received RTS or CTS, it does not set its NAV to the value contained in the RTS or CTS.

In some embodiments, and with reference to FIG. 7, AP1 may be aware of the maximum number of jammers in the system 700. The AP1 may insert in a RTS the value of the maximum number of jammers, M, and then send the RTS to the destination node, STA1. In some embodiments, the value M may be included in an information element of the RTS. The STA1 then copies the received value of M and inserts the value of M in the CTS sends the CTS to the AP1 in response to the RTS. If a node receives the RTS or CTS with the value of M, the node then picks a random number, X, in the range of zero to M. If the X is less than M then the node sets the NAV of the RTS/CTS. Accordingly, the first indication may comprise an event when the value of M is greater than X. If not, then the node does not set the NAV. Accordingly, the second indication may comprise an event when the value of M is less than X.

Figure 8:
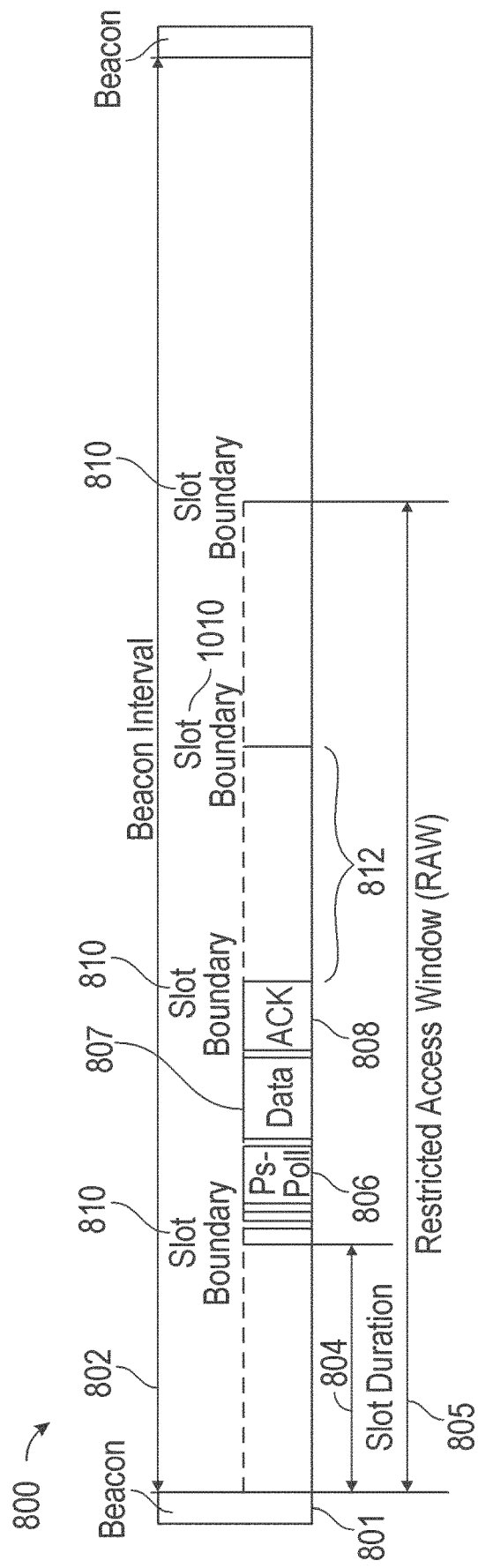
FIG. 8 is a time sequence diagram of an exemplary restricted access window (RAW) operation.

FIG. 8 is a time sequence diagram of an exemplary restricted access window (RAW) operation. In the 802.11ah standard, the RAW feature enables restricting uplink channel access to a small number of STAs and spreading their uplink access attempts over a longer period of time which may improve the efficiency of the utilization of the medium by reducing collisions. In the RAW operation, AP may allocate more than one RAW 805 for different groups of STAs within a beacon interval 802 with different RAW parameters. This allocation may be indicated in the RAW parameter set (RPS) element of the beacon. Each RAW 805 includes at least one slot with a slot duration 805 and slot boundary 810. Within each slot (i.e. slot 812), only STAs belonging to the group of the slot may transmit or receive during the slot duration 804. In some embodiments, the APs and STAs may begin a RTS/CTS exchange as described above. In some aspects, the AP may selective silence the jammers of the system by utilizing the RAW operation and only including certain STAs in the group identifier of a slot.

FIG. 9 is a flow chart of an exemplary method 900 of reserving access to wireless communication medium for a plurality of wireless devices in accordance with certain embodiments described herein. The method 900 may be used to generate and transmit any of the messages described above. The messages may be transmitted by the AP 104 to one or more of the STAs 106a-106d shown in FIG. 1. In addition, the wireless device 202 shown in FIG. 2 may represent a more detailed view of the AP 104, as described above. Thus, in one implementation, one or more of the steps in flowchart 900 may be performed by, or in connection with, a processor and/or transmitter, such as the processor 204 and transmitter 210 of FIG. 2, although those having ordinary skill in the art will appreciate that other components may be used to implement one or more of the steps described herein. Although blocks may be described as occurring in a certain order, the blocks can be reordered, blocks can be omitted, and/or additional blocks can be added.

In operation block 902, the AP 104 or a STA 106 may transmit a message including a first indication for a first subset of wireless devices of the plurality of wireless devices to set a network allocation vector (NAV) and further including a second indication for a second subset of wireless devices of the plurality wireless devices to not set the NAV, thereby reserving access to the wireless medium for at least the second subset of the plurality of wireless devices. For example, with respect to FIG. 1, the AP 104 may transmit a message using a transmission characteristic such that at least the STAs 106a and 106b may decode the message. In such an implementation, at least the STAs 106a and 106b may be silenced for the duration of the message, thus reserving access to the medium for at least STAs 106c and 106d.

In some embodiments, an apparatus may perform one or more of the functions described above with respect to method 900. The apparatus may comprise means for generating a message including a first indication for a first subset of wireless devices of a plurality of wireless devices to set a network allocation vector (NAV) and further including a second indication for a second subset of wireless devices of the plurality wireless devices to not set the NAV. The apparatus may further comprise means for transmitting the message.

In some embodiments, the AP 104 or a STA 106 may transmit a message reserving a medium and instructing receiving wireless devices to wait for an indicated number of time slots where the medium is idle before trying to access the medium. For example, with respect to FIG. 1, the AP 104 may transmit a message to the STAs 106a-106d reserving a medium for a number of time slots. In such an implementation, the STAs 106a-106d will wait for the indicated number of time slots before trying to access the medium, and check whether a different device has accessed the medium before.

In some embodiments, an apparatus may comprise means for generating a message reserving a medium and instructing receiving wireless devices to wait for an indicated number of time slots where the medium is idle before trying to access the medium. The apparatus may further comprise means for transmitting the message.

A person/one having ordinary skill in the art would understand that information and signals can be represented using any of a variety of different technologies and techniques. For example, data, instructions, commands, information, signals, bits, symbols, and chips that can be referenced throughout the above description can be represented by voltages, currents, electromagnetic waves, magnetic fields or particles, optical fields or particles, or any combination thereof.

Various modifications to the implementations described in this disclosure can be readily apparent to those skilled in the art, and the generic principles defined herein can be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

While the foregoing is directed to aspects of the present disclosure, other and further aspects of the disclosure may be devised without departing from the basic scope thereof, and the scope thereof is determined by the claims that follow.

What is claimed is:

1. A method of reserving access to a wireless communication medium, comprising:
   selecting one or more legacy stations (STAs) of a plurality of wireless devices to set their network allocation vectors (NAVs), wherein the plurality of wireless devices further includes one or more high efficiency wireless (HEW) STAs, and wherein the one or more legacy STAs and the one or more HEW STAs are not overlapping; and
   transmitting a message including a first field that includes a first indication for the one or more legacy STAs to set their NAVs and a second field that includes a second indication for the one or more HEW STAs to not set their NAVs, thereby reserving access to the wireless communication medium for the one or more HEW STAs, wherein:

the second indication is decodable by the one or more HEW STAs and not decodable by the one or more legacy STAs;

the first indication is decodable by both the one or more legacy STAs and the one or more HEW STAs; and the one or more legacy STAs set their NAVs based on decoding the first indication without decoding the second indication.

2. The method of claim 1, wherein the second field is at least one of a type field or a subtype field of the message.

3. The method of claim 1, wherein the message comprises a clear to send message, and wherein the first indication includes a list of medium access control addresses of the one or more legacy STAs of the plurality of wireless devices.

4. The method of claim 1, wherein the message comprises a request to send message, and wherein the first indication includes a list of medium access control addresses of the one or more legacy STAs of the plurality of wireless devices.

5. The method of claim 4, further comprising receiving a clear to send message, the clear to send message including the list of the medium access control addresses as in the request to send message.

6. The method of claim 1, wherein the message is a quality of service null frame.

7. The method of claim 1, wherein the message is a control wrapper frame.

8. The method of claim 1, wherein the message comprises an instruction for wireless devices receiving the message to wait for an indicated number of time slots when the wireless communication medium is idle before attempting to access the wireless communication medium.

9. The method of claim 1, wherein:
the first field is a time duration field; and
the second field is an address field.

10. The method of claim 9, wherein the message comprises a clear to send message and the address field is a receiver address field, wherein the first indication includes a time duration in the time duration field of the clear to send message, and wherein the second indication includes information in the receiver address field of the clear to send message that identifies one of a multicast address or a specific medium access control address.

11. The method of claim 10, wherein the second indication further includes information in a service field of the clear to send message.

12. The method of claim 9, wherein the message is a request to send message and the address field is a transmitter address field, wherein the first indication includes a time duration in the time duration field of the request to send message, and wherein the second indication includes information in the transmitter address field of the request to send message that identifies a multicast address and includes information in a service field of the request to send message.

13. The method of claim 9, wherein:
the message is a frame from the group consisting of a data frame and a management frame;
the address field is a transmitter address field;
the first indication includes a time duration in the time duration field of the request to send message;
the second indication includes information in the transmitter address field of the frame that identifies a multicast address and further includes information in a service field of the frame.

14. A device for wireless communication, comprising:
a processor configured to:
select one or more legacy stations (STAs) of a plurality of wireless devices to set their network allocation vectors (NAVs), wherein the plurality of wireless devices further includes one or more high efficiency wireless (HEW) STAs, and wherein the one or more legacy STAs and the one or more (HEW STAs are not overlapping; and generate a message including a first field that includes a first indication for the one or more legacy STAs to set their NAVs and a second field that includes a second indication for the one or more HEW STAs to not set their NAVs; and a transmitter configured to transmit the message, thereby reserving access to a wireless communication medium for the one or more HEW STAs, wherein:

the second indication is decodable by the one or more HEW STAs and not decodable by the one or more legacy STAs;

the first indication is decodable by both the one or more legacy STAs and the one or more HEW STAs; and the one or more legacy STAs set their NAVs based on decoding the first indication without decoding the second indication.

15. The device of claim 14, wherein the second field is at least one of a type field or a subtype field of the message.

16. The device of claim 14, wherein the message includes an instruction for wireless devices receiving the message to wait for an indicated number of time slots when the wireless communication medium is idle before attempting to access the wireless communication medium.

17. The device of claim 14, wherein:
the first field is a time duration field; and
the second field is an address field.

18. A device for wireless communication, comprising:
means for selecting one or more legacy stations (STAs) of a plurality of wireless devices to set their network allocation vectors (NAVs), wherein the plurality of wireless devices further includes one or more high efficiency wireless (HEW) STAs, and wherein the one or more legacy STAs and the one or more HEW STAs are not overlapping;

means for generating a message including a first field that includes a first indication for the one or more legacy STAs to set their NAVs and a second field that includes a second indication for the one or more HEW STAs to not set their NAVs; and means for transmitting the message, thereby reserving access to a wireless communication medium for the one or more HEW STAs, wherein:

the second indication is decodable by the one or more HEW STAs and not decodable by the one or more legacy STAs;

the first indication in the first field is decodable by both the one or more legacy STAs and the one or more HEW STAs of the plurality of wireless devices; and the one or more legacy STAs set their NAVs based on decoding the first indication without decoding the second indication.

19. The device of claim 18, wherein the message comprises a clear to send message and the address field is a receiver address field, wherein the first indication includes a time duration in the time duration field of the clear to send message, and wherein the second indication includes information in the receiver address field of the clear to send message that identifies one of a multicast address or a specific medium access control address.

20. The device of claim 19, wherein the second indication further includes information in a service field of the clear to send message.

21. A non-transitory computer-readable medium comprising code that, when executed, causes an apparatus to:
- select one or more legacy stations (STAs) of a plurality of wireless devices to set their network allocation vectors (NAVs), wherein the plurality of wireless devices includes one or more high efficiency wireless (HEW) STAs, and wherein the one or more legacy STAs and the one or more HEW STAs are not overlapping; and
- transmit a message including a first field that includes a first indication for the one or more legacy stations (STAs) to set their NAVs and a second field that includes a second indication for the one or more HEW STAs to not set their NAVs, thereby reserving access to a wireless communication medium for the one or more HEW STAs, wherein:
  - the second indication is decodable by the one or more HEW STAs and not decodable by the one or more legacy STAs;
  - the first indication is decodable by both the one or more legacy STAs and the one or more HEW STAs; and
  - the one or more legacy STAs set their NAVs based on decoding the first indication without decoding the second indication.

* * * * *